United States Patent Office 3,557,638
Patented Jan. 26, 1971

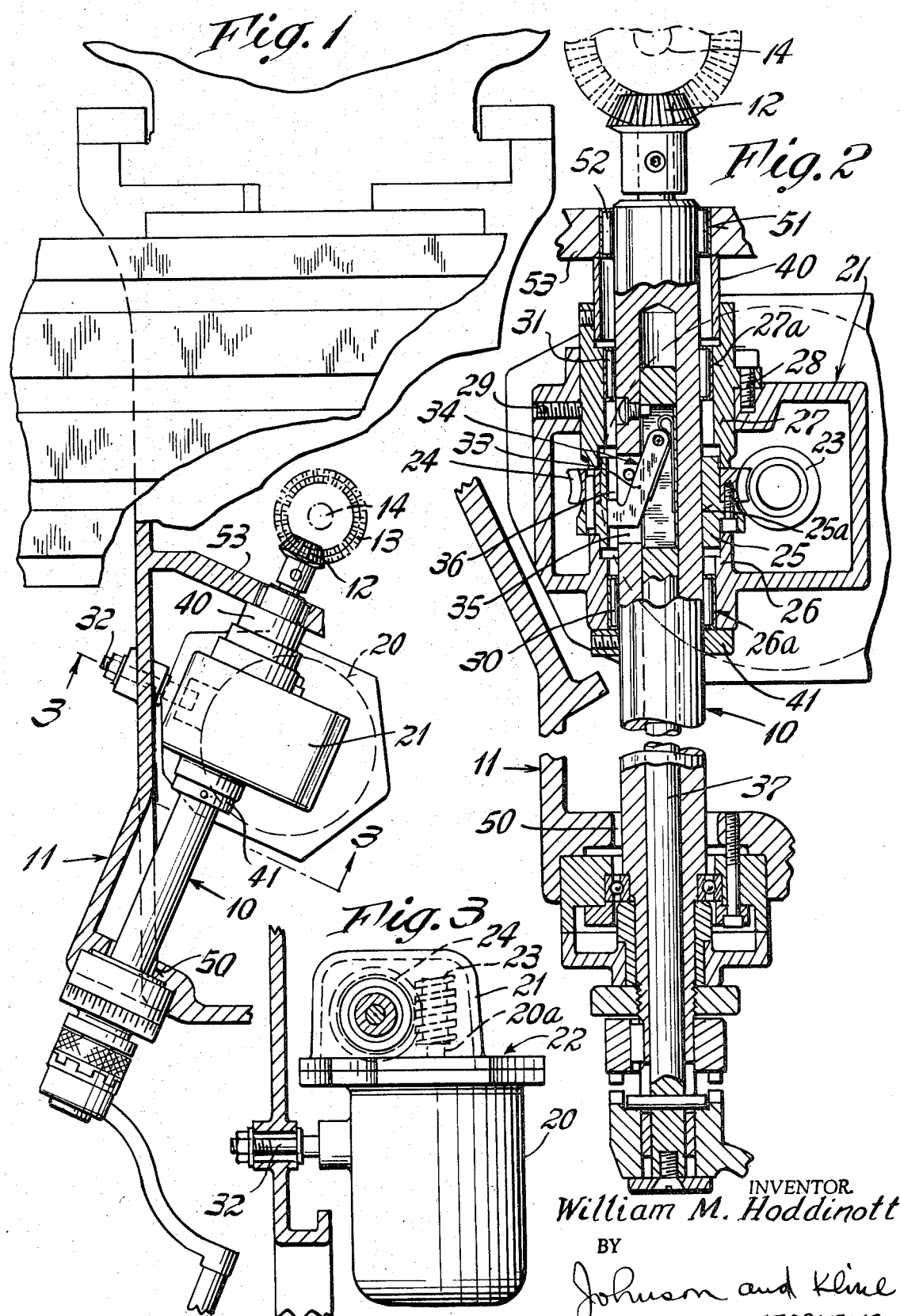

3,557,638
POWER DRIVE FOR ROTATABLE SHAFT
William M. Hoddinott, Milford, Conn., assignor to Textron Inc., Providence, R.I., a corporation of Delaware
Filed Aug. 12, 1969, Ser. No. 849,940
Int. Cl. F16h 1/16
U.S. Cl. 74—625                                               6 Claims

ABSTRACT OF THE DISCLOSURE

A power drive for rotating a shaft comprising a driving motor and gear housing mounted on and suspended from said shaft intermediate the ends thereof and having clutch means for drivingly connecting a gear in the gear housing to said shaft.

---

The present invention is an improvement on my Pat. No. 3,424,028. In this patent a shaft for operating a feed screw is selectively rotated by a handle or a power operator. The power operator which comprises an electric motor and connected gearing for driving the shaft is mounted on the exterior of the knee of the machine and has an external bevel gear meshing with a bevel gear mounted on the shaft carried by the knee. With this arrangement the motor was exposed and subjected to damage from unintentional blows and was exposed to dirt and chips, was difficult to assemble with the shaft, particularly in the field, as it requires careful alignment of the bevel gears disposed within the knee and since the shaft had a tendency to bow in the center under load, the bevel gears had a tendency to go out of register and become damaged.

The present invention overcomes these problems by providing a motor and gear unit carried by a housing disposed within the knee and suspended from said shaft, the housing and driven gear rotatably carried by the housing having aligned bores to receive the shaft. The shaft and housing can be readily assembled and the housing anchored against rotation.

A feature of the invention resides in the fact that the motor and gearing connected thereo are disposed within the knee and are protected from dirt and chips and from accidential damaging blows.

Another feature of the invention resides in the ease and simplicity of mounting the unit drive and the shaft without the difficulties of aligning the meshing gears within the knee.

A still further feature of the invention resides in the mounting of the power unit on the shaft to be suspended thereby whereby flexing of the shaft under load will not separate the gears and damage them.

Other features and advantages of the invention will be apparent from the specification and claims when considered in connection with the accompanying drawings wherein:

FIG. 1 is a view, partly in section, showing the operating shaft and power source mounted thereon.

FIG. 2 is a view, partly in section, through the operating shaft.

FIG. 3 is a view taken along line 3—3 of FIG. 1.

As illustrated in the drawing, the hollow operating shaft 10 is mounted in the knee 11 and has a bevel gear 12 engaging the bevel gear 13 on a vertical lift screw 14 to rotate the same and raise and lower the knee. The shaft operates in the manner disclosed in said U.S. Pat. No. 3,424,028 to which reference is made; however, a new power drive is provided.

As shown in the drawing, the power drive comprises a motor 20 secured to a gear housing 21 to form the power unit 22. The motor has a driving gear 23 on the shaft 20a thereof, herein illustrated as a worm, meshing with a driven gear 24, herein illustrated as a wormwheel secured to a bushing 25 (FIG. 2) rotatably supported by and located between a pair of sleeves 26, 27 on the gear housing. While the sleeve 27 can be formed integral with the housing, it is preferred that the sleeve 27 be formed as a separate element to facilitate assembly of the unit and secured to the housing in proper position by bolt 28 and set screw 29.

The sleeves and bushing have aligned shaft-receiving bores 25a, 26a, 27a. When the shaft is assembled in position in the housing, it is relatively rotatable with respect to the housing and freely rotatable in the bearings 30, 31 carried by he bores 26a, 27a of the sleeves in the housing and the power unit is supported on and suspended from the shaft 10. Preferably, the power unit is held against rotation with the shaft by a bolt 32 clamped to the knee as shown in FIG. 3.

During the assembly operation, the housing 21 is properly located on the shaft to enable the pivoted dog 33 of clutch 34 to move through a slot 35 in the hollow shaft and engage in the groove 36 in the bushing 25 when the shaft is in the position of FIG. 2 to drivingly connect the driven gear 24 to the shaft 10 to rotate the same in response to operation of the core shaft 37 carried by the hollow shaft 10.

In order to prevent longitudinal movement of the housing on the shaft and to properly locate and maintain the bushing carried by the housing with respect to the dog 33 of clutch 34, the housing 21 has a spacer unit 40 adjustably secured to and carried by sleeve 27 to engage the wall of the knee as shown in FIG. 2. This not only locates the housing on the shaft but prevents movement thereof toward the wall. A collar 41 secured to the shaft and engaging the end of sleeve 26 prevents movement of the housing on the shaft and away from the wall.

With this construction it will be seen that there is a unitary self-contained power drive unit which is mounted within the knee in a protected position against chips and unintentional blows which might damage the same when in position on the shaft.

The unit can be readily assembled with the shaft by passing the shaft through the opening 50 in the front of the knee through the aligned bores 26, 27 in the unit 22 and the bushing 25 and through the opening 51 and bearing 52 in the back wall 53 of the knee so that the gear 12 meshes with the gear 13 on the vertical lift screw 14.

With this arrangement it will be seen that the assembly can be easily made even though the work must be done under the knee since gears 23, 24 have a fixed relation and there is no gearing to align.

Furthermore, since the unit and its gearing for driving the shaft are a unitary structure which is suspended from the shaft, any bowing of the shaft in the center under load will not disalign the gearing and damage the gearing. The power unit can be accurately located on the shaft in order to permit clutching of the shaft to the driven gear in a simple and easy manner.

Variations and modifications may be made within the scope of the invention and portions of the improvements may be used without others.

I claim:

1. A power drive for a feed screw operating mechanism for a machine having a rotatable shaft provided with gearing drivingly connecting said shaft to said feed screw comprising a gear housing having an electric motor unit connected thereto to be supported thereby with the gear housing having a driven gear means rotatable therein and drivingly connected to a driving gear driven by said motor to provide a self-contained power unit, said gear housing and driven gear having aligned bores to receive the rotatable shaft to be mounted thereon with the housing being suspended therefrom, means for holding said gear housing from rotation about said hollow shaft, and clutch means connecting the shaft to be driven gear means to rotate the shaft in response to rotation of the motor to provide the power drive for the shaft.

2. The invention as defined in claim 1 wherein the aligned bores in the housing are formed in sleeves on the housing and the bore in the drive gear means is formed in a bushing rotatable on the housing and connected to a driven gear.

3. The invention as defined in claim 2 wherein the sleeves carry bearings for the shaft to provide for free rotation of the shaft in said housing.

4. The invention as defined in claim 1 wherein the rotatable shaft is a hollow shaft and the clutch means comprises a clutch dog pivotally mounted within said hollow shaft and projectable through a slot in said hollow shaft and engaging a groove in the drive gear means to rotate said shaft thereby.

5. The invention as defined in claim 1 wherein there are means at each end of the housing for properly locating and maintaining the position of the housing on the shaft.

6. The invention as defined in claim 1 wherein the driving gear is a worm on said motor shaft and the driven gear is a wormwheel mounted on a bushing rotatable on the housing and surrounding the rotatable shaft and in fixed relation with and meshing with said worm.

References Cited
UNITED STATES PATENTS

| | | | |
|---|---|---|---|
| 2,915,923 | 12/1959 | Burg | 74—625X |
| 2,934,974 | 5/1960 | Schoepe | 74—625 |
| 3,449,982 | 6/1969 | Hutchinson et al. | 74—626 |

LEONARD H. GERIN, Primary Examiner

U.S. Cl. X.R.

74—425